(12) United States Patent
Miller et al.

(10) Patent No.: US 6,901,111 B2
(45) Date of Patent: May 31, 2005

(54) INTERFACE CIRCUIT AND METHOD FOR DIGITAL SIGNALS

(75) Inventors: Peter Miller, Shefford (GB); Peter Hartnett, Stotfold near Hitchin (GB)

(73) Assignee: Motorola, Inc., Schaumburg, IL (US)

( * ) Notice: Subject to any disclaimer, the term of this patent is extended or adjusted under 35 U.S.C. 154(b) by 950 days.

(21) Appl. No.: 09/759,857

(22) Filed: Jan. 12, 2001

(65) Prior Publication Data

US 2001/0008548 A1 Jul. 19, 2001

(30) Foreign Application Priority Data

Jan. 14, 2000 (GB) .............................................. 0000907

(51) Int. Cl.[7] .............................. H04B 3/00; H04L 25/00
(52) U.S. Cl. ...................................... 375/258; 327/205
(58) Field of Search ...................... 375/258, 7; 700/297; 340/693

(56) References Cited

U.S. PATENT DOCUMENTS 4,425,663 A    1/1984  Lam
4,993,627 A  *  2/1991  Phelan et al. ............... 340/5.67
5,303,265 A  *  4/1994  McLean ....................... 375/286
5,336,942 A  *  8/1994  Khayat ........................ 327/206
5,964,854 A  * 10/1999  Roozenbeek et al. ....... 710/301
6,130,505 A  * 10/2000  Webb et al. ................... 315/8
6,438,462 B1 *  8/2002  Hanf et al. .................. 700/297

FOREIGN PATENT DOCUMENTS

EP          0307345 A1    9/1987
JP          58-156225     9/1983

* cited by examiner

Primary Examiner—Stephen Chin
Assistant Examiner—Harry Vartanian
(74) Attorney, Agent, or Firm—Brian M. Mancini

(57) ABSTRACT

An interface circuit (100) and method for interfacing received digital signals, relative to a first ground potential, for transmission on the bus, relative to a second ground potential. A transformer (106) passes edges of the received digital signals. A Schmitt trigger (110) reconstructs signals from the edges of signals passed by the transformer, so as to produce digital signals, for transmission on the bus, relative to the second ground potential. The Schmitt trigger bias points may be set by an oscillators incorporating another Schmitt triggers (120) located on the same semiconductor die to reduce temperature variability.

4 Claims, 1 Drawing Sheet

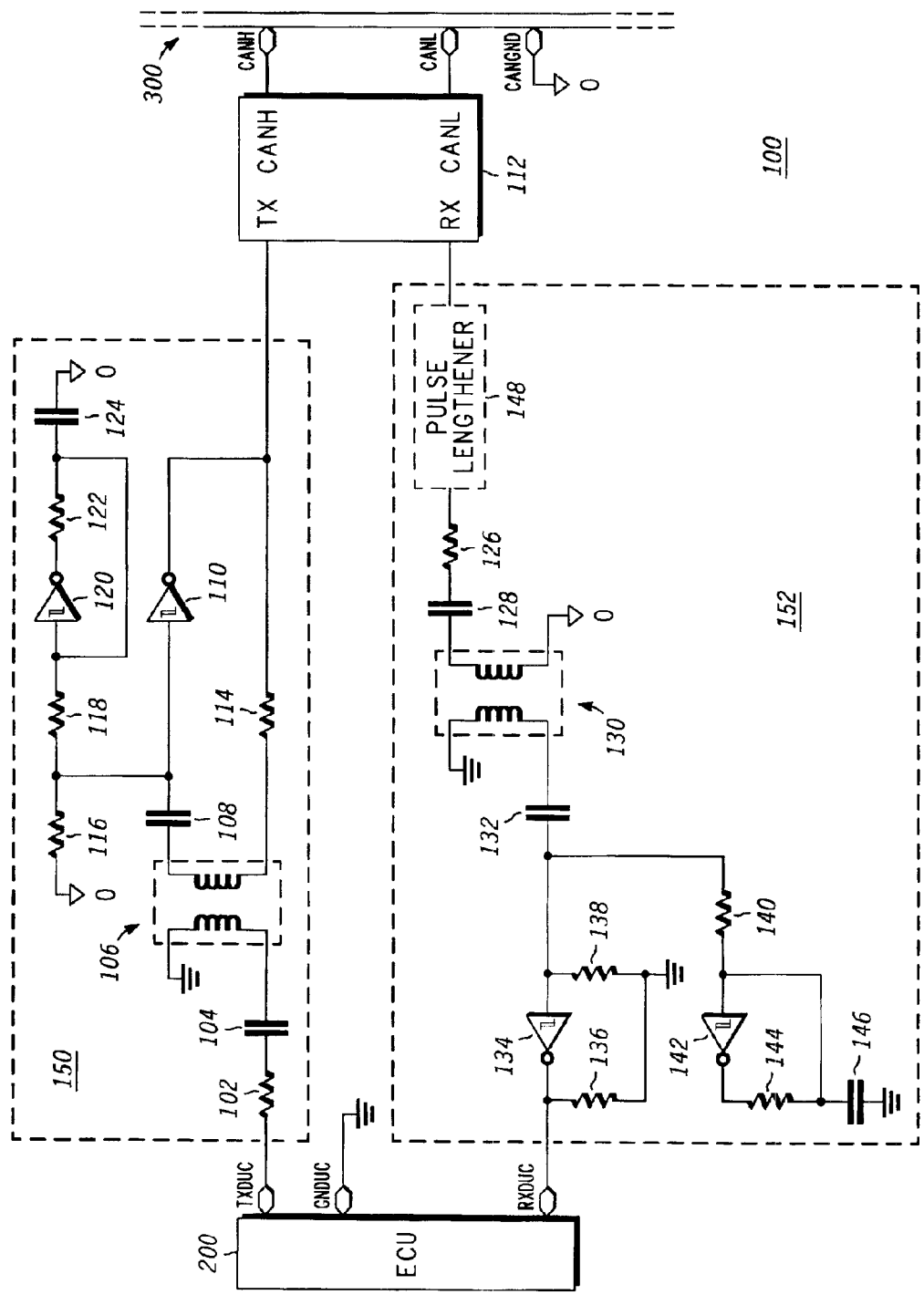

INTERFACE CIRCUIT AND METHOD FOR DIGITAL SIGNALS

FIELD OF INVENTION

This invention relates to interface circuits for digital signals.

BACKGROUND OF INVENTION

In electronic systems such as those in an automobile, electronic control units (ECUs) distributed around a vehicle are typically connected to a communication bus, such as the Controller Area Network (CAN) bus which is well-known in industrial and automotive applications. In use, voltage differences between different (ECUs) on the bus, due for instance to differences in ground potential at the different ECUs, can cause communication errors.

It has been proposed to overcome this problem by use of opto-isolators to isolate the signals produced by different ECUs. However, such a proposal has a number of drawbacks: firstly, opto-isolators are expensive; secondly, the reliability of opto-isolators may not be sufficiently robust to withstand the exacting mechanical and temperature conditions produced in an automotive environment.

It is an object of the present invention to provide an interface circuit and method for digital signals, wherein the above-mentioned disadvantages may be overcome or at least alleviated.

SUMMARY OF INVENTION

In accordance with a first aspect of the invention there is provided an interface circuit for digital signals as claimed in claim 1.

In accordance with a second aspect of the invention there is provided an interface circuit for digital signals as claimed in claim 4.

In accordance with a third aspect of the invention there is provided a method for interfacing digital signals as claimed in claim 9.

BRIEF DESCRIPTION OF DRAWINGS

One ECU interface circuit incorporating the invention for isolating signals of units on a CAN bus will now be described, by way of example only, with reference to the accompanying drawings, in which:

FIG. 1 shows a schematic circuit diagram of a CAN bus ECU interface circuit.

DETAILED DESCRIPTION

Referring to FIG. 1, a circuit 100 for interfacing an ECU 200 to a CAN bus 300 includes terminals TxduC, GnduC and RxduC for connection respectively to transmit, ground and receive terminals of the ECU 200. The interface circuit 100 also has CANH, CANL and CANGnd terminals for connection respectively to high, low and ground connections of the CAN bus 300.

The TxduC terminal is connected via a resistance 102 and a capacitance 104 to an end of a winding of a transformer 106, the other end of the winding being connected to earth. Another winding of the transformer 106 has one end connected to a datum voltage "0", the other end of the winding being connected via a capacitance 108 to an input of a Schmitt trigger 110. The output of the Schmitt trigger 110 is connected to the Tx terminal of a conventional CAN Driver 112 which produces signals of appropriate voltage, timing, etc., conforming to the CAN bus standard. The Schmitt trigger 110 also has its output connected via a resistance 114 to the datum voltage "0", and has its input connected via a resistance 116 to the datum voltage "0". The input of the Schmitt trigger 110 is also connected via a resistance 118 to the input of a Schmitt trigger 120. The output of the Schmitt trigger 120 is connected via a resistance 122 and a capacitance 124 to the datum voltage "0". The input of the Schmitt trigger 120 is also connected to a node intermediate the resistance 122 and the capacitance 124.

The GnduC terminal is connected to earth.

The CAN Driver 112 has its Rx terminal connected (via an optional pulse lengthener 148) via a resistance 126 and a capacitance 128 to an end of a winding of a transformer 130, the other end of the winding being connected to the datum voltage "0". Another winding of the transformer 130 has one end connected to earth, the other end of the winding being connected via a capacitance 132 to an input of a Schmitt trigger 134. The output of the Schmitt trigger 134 is connected to the RxduC terminal. The Schmitt trigger 134 also has its output connected via a resistance 136 to earth, and has its input connected via a resistance 138 to earth. The input of the Schmitt trigger 134 is also connected via a resistance 140 to the input of a Schmitt trigger 142. The output of the Schmitt trigger 142 is connected via a resistance 144 and a capacitance 146 to the earth. The input of the Schmitt trigger 142 is also connected to a node intermediate the resistance 144 and the capacitance 146.

The CAN Driver 112 has its CANH and CANL terminals connected respectively to the CANH and CANL terminals of the CAN bus 300. The CANGnd terminal is connected to the datum voltage "0".

It will be appreciated that the interface circuit 100 is made up of two similar, complementary interface circuits 150 (elements 102–110 & 114–124) and 152 (elements 126–148) which respectively interface pulses for transmission on the bus 300 and pulses received from the bus 300.

Pulses (relative to earth potential) received from the TxduC terminal of the ECU 200 are differentiated by the capacitor 104 to produce positive-going and negative-going spikes corresponding to the pulses' positive-going and negative-going transitions are passed by the transformer 106. The resulting signal (consisting of positive-going and negative-going spikes separated by a DC level) at the output winding of the transformer 106 is applied to the Schmitt trigger 110, in which a positive-going spike at its input causes its upper trigger level to be crossed (resulting in the output of the Schmitt trigger going low), and a negative-going spike at its input causes its upper lower trigger level to be crossed (resulting in the output of the Schmitt trigger going high). Thus the Schmitt trigger 110 reconstructs (from the pulse edge signal passed by the transformer 106) the pulse signal received at the terminal TxduC. However, it will be noted that whereas the pulse signal received at the terminal TxduC is relative to the earth potential (e.g., at the input winding of the transformer 106), the reconstructed pulse signal at the output of the Schmitt trigger 110 is relative to the datum voltage "0". Thus, the interface circuit 150 serves to isolate signals for transmission on the CAN bus 300 between the ground potential (earth) of the ECU 200 and the ground potential (datum voltage "0") of the (DAN bus 300.

It will be understood that the complementary interface circuit 152 functions analogously (receiving a pulse signal relative to datum voltage "0" at the Rx terminal of the CAN Driver 112, passing the edges of this signal through the transformer 130, and reconstructing from the edge signal a pulse signal relative to earth potential which is equivalent to the pulse signal received at the terminal Rx) to isolate pulse signals received from the CAN bus 300 between its ground potential (datum voltage "0") and the ground potential (earth) of the ECU 200.

The transformers 106 and 130 are small, low-cost transformers which, in use of the interface circuit 100, act as isolation elements. Only the edges of pulse signals are passed via the transformers, allowing the transformers to be of low inductance (and hence low cost) while achieving very low propagation delay.

As explained above, signal reconstruction (reconstruction of pulses from the edges passed via the transformers) is performed by the Schmitt triggers 110 and 134 for the circuit's transmit and receive functions respectively. The optimum bias point for the DC level of signal input to each of the Schmitt triggers 110 and 134 is automatically determined by use of additional Schmitt trigger 120 and 142 respectively, all the Schmitt triggers 110, 134, 120 and 142 being formed on the same integrated circuit die (not shown). The additional Schmitt triggers 120 and 142 are arranged to function as simple oscillators having a nominal 50% duty cycle. It will be understood that, with variations in temperature, the trigger points of Schmitt triggers vary. However, it will be understood that in the interface circuits 150 and 152 of the circuit 100, any variation of the trigger point of the Schmitt trigger 110 or 134 due to temperature variation is counteracted by variation of that Schmitt trigger's bias point due to variation of the duty cycle of the oscillator formed by the additional Schmitt trigger 120 or 142 respectively, because of variation of that additional Schmitt trigger's bias point caused by the same temperature variation. Thus, the bias points of the Schmitt triggers 110 and 142 used for reconstruction of the pulse signals are dynamically and optimally set.

It will be appreciated that the interface circuit 100 provides simple and effective isolation of signals on the CAN bus 300 through use of the small, low-cost isolating transformers 106 and 130 and the self-biasing arrangement of Schmitt triggers 110, 134, 120 and 142.

It will be understood that the interface circuit described above could be further enhanced. For example, a pulse lengthener 148 could additionally be used to ensure propagation of pulses of very short duration, as may be required in some CAN applications.

It will be appreciated that although in the embodiment described above an interface circuit 100 (comprising complementary interface circuits 150 and 152) is illustrated as coupling one ECU 200 to the CAN bus 300, in practice two or more ECU (not shown) may be interfaced by their own respective circuits such as the interface circuit 100 to isolate signals on the CAN bus between the ground potential of the bus and the individual ground potentials of the ECUs.

It will be further appreciated that in interfacing a particular ECU it may not be necessary for the interface circuit to have the two complementary interface circuits such as 150 and 152 described above. For example, if an ECU is simply to transmit signals onto the bus (without receiving) only an interface circuit such as the interface circuit 150 may be provided, or if an ECU is simply to receive signals from the bus (without transmitting) only an interface circuit such as the interface circuit 152 may be provided.

It will further be appreciated as a result of the above-discussed properties of good isolation, the interface circuit 100, although rated for operation at a nominal CAN bus system voltage of 12V, could instead be used with 24V or even 42V systems, the good isolation allowing operation with one wire shorted to battery or ground.

What is claimed is:

1. An interface circuit for digital signals, comprising:
   receiving means for receiving digital signals relative to a first ground potential;
   transformer means coupled to the receiving means for passing edges of signals received at the receiving means; and
   a first Schmitt trigger coupled to the transformer means for reconstructing signals from the edges of signals passed by the transformer means, so as to produce digital signals relative to a second ground potential; and
   a second Schmitt trigger configured as an oscillator and coupled to the first Schmitt trigger, the oscillating second Schmitt trigger setting a single bias point of the first Schmitt trigger so as to reduce the temperature variability thereof.

2. The interface circuit according to claim 1 wherein the second Schmitt trigger biases the DC level of the edge signals between the trigger levels of the first Schmitt trigger.

3. The interface circuit according to claim 1 wherein the first and second Schmitt triggers are located on the same semiconductor die in order to reduce the temperature variability of the interface circuit.

4. An interface circuit for interfacing digital signals to and from a bus, comprising:
   first receiving means for receiving digital signals, relative to a first ground potential, for transmission on the bus;
   first transformer means coupled to the first receiving means for passing edges of signals received at the first receiving means;
   a first Schmitt trigger coupled to the first transformer means for reconstructing signals from the edges of signals passed by the first transformer means, so as to produce digital signals, relative to a second ground potential, for transmission on the bus;
   a second Schmitt trigger configured as an oscillator and coupled to the first Schmitt trigger, the oscillating second Schmitt trigger setting a single bias point of the first Schmitt trigger so as to reduce the temperature variability thereof;
   second receiving means for receiving digital signals, relative to the second ground potential, from the bus;
   second transformer means coupled to the second receiving means for passing edges of signals received at the second receiving means;
   a third Schmitt trigger coupled to the second transformer means for reconstructing signals from the edges of signals passed by the second transformer means, so as to produce digital signals, relative to the first ground potential, from the bus; and
   a fourth Schmitt trigger configured as an oscillator and coupled to the third Schmitt trigger, the oscillating fourth Schmitt trigger setting a single bias point of the third Schmitt trigger so as to reduce the temperature variability thereof.

* * * * *